US011184353B2

(12) United States Patent
Wilson et al.

(10) Patent No.: US 11,184,353 B2
(45) Date of Patent: Nov. 23, 2021

(54) TRUSTED STATUS TRANSFER BETWEEN ASSOCIATED DEVICES

(71) Applicant: Apple Inc., Cupertino, CA (US)

(72) Inventors: James C. Wilson, San Jose, CA (US); Lestat Ali, Santa Clara, CA (US); Aniwat Arromratana, San Jose, CA (US)

(73) Assignee: Apple Inc., Cupertino, CA (US)

(*) Notice: Subject to any disclaimer, the term of this patent is extended or adjusted under 35 U.S.C. 154(b) by 219 days.

(21) Appl. No.: 16/281,001

(22) Filed: Feb. 20, 2019

(65) Prior Publication Data
US 2019/0281047 A1 Sep. 12, 2019

Related U.S. Application Data

(63) Continuation of application No. 16/113,851, filed on Aug. 27, 2018, now Pat. No. 10,230,722, which is a (Continued)

(51) Int. Cl.
*H04L 29/06* (2006.01)
*G06F 21/44* (2013.01)
(Continued)

(52) U.S. Cl.
CPC .......... *H04L 63/0853* (2013.01); *G06F 21/44* (2013.01); *H04L 63/0807* (2013.01);
(Continued)

(58) Field of Classification Search
CPC ............. H04L 63/0846; H04L 63/0853; H04L 63/0807; H04L 63/0838; H04L 63/10;
(Continued)

(56) References Cited

U.S. PATENT DOCUMENTS 7,185,363 B1 * 2/2007 Narin .................. G06F 21/10
726/18
8,130,961 B2 3/2012 Machani et al.
(Continued)

OTHER PUBLICATIONS

NPL Search Terms (Year: 2020).*
(Continued)

*Primary Examiner* — Syed A Zaidi
(74) *Attorney, Agent, or Firm* — Dickinson Wright RLLP

(57) ABSTRACT

The embodiments set forth systems and techniques to authenticate a user device for device services, such as by transferring or extending a trusted device status from a separate and trusted associated user device, which can be paired with the user device. This can be done automatically without requiring the user to sign in at or on behalf of the user device, and the automated process can include verifying a trusted status for the associated user device, receiving data items from both devices, evaluating the data items, and facilitating an authentication of the user device when the evaluating returns a favorable result. Data items can include provisioned machine identifiers, temporally limited one-time user passwords, and a provisioned password reset key.

(Continued)

US 11,184,353 B2

Page 2

Authentication or trusted device status transfer can be achieved by way of an authentication token that is given to the user device.

20 Claims, 9 Drawing Sheets

Related U.S. Application Data continuation of application No. 15/167,735, filed on May 27, 2016, now Pat. No. 10,063,540.

(60) Provisional application No. 62/235,418, filed on Sep. 30, 2015, provisional application No. 62/172,221, filed on Jun. 7, 2015.

(51) Int. Cl.
*H04W 12/065* (2021.01)
*H04W 12/06* (2021.01)

(52) U.S. Cl.
CPC ...... *H04L 63/0838* (2013.01); *H04L 63/0846* (2013.01); *H04L 63/10* (2013.01); *H04W 12/065* (2021.01); *H04W 12/068* (2021.01); *G06F 2221/2131* (2013.01)

(58) Field of Classification Search
CPC ............ G06F 2221/2131; G06F 21/44; H04W 12/0608; H04W 12/0605
USPC .......................................................... 726/4
See application file for complete search history.

(56) References Cited

U.S. PATENT DOCUMENTS

| | | | |
|---|---|---|---|
| 8,364,951 B2 * | 1/2013 | Peterka | H04L 63/0807 |
| | | | 713/155 |
| 9,281,949 B2 * | 3/2016 | Nair | H04L 9/3247 |
| 9,602,505 B1 | 3/2017 | Schulman | |
| 10,063,540 B2 | 8/2018 | Wilson et al. | |
| 10,230,722 B2 | 3/2019 | Wilson et al. | |
| 2003/0182584 A1 | 9/2003 | Banes et al. | |
| 2004/0193919 A1 | 9/2004 | Dabbish et al. | |
| 2006/0285692 A1 * | 12/2006 | Kerstens | H04L 41/00 |
| | | | 380/270 |
| 2007/0003062 A1 | 1/2007 | Mizikovsky et al. | |
| 2007/0005972 A1 | 1/2007 | Mizikovsky et al. | |
| 2007/0192837 A1 * | 8/2007 | Lee | H04L 63/0853 |
| | | | 726/4 |
| 2008/0034216 A1 | 2/2008 | Law | |
| 2008/0092211 A1 * | 4/2008 | Klemets | H04L 9/3213 |
| | | | 726/3 |
| 2013/0091585 A1 | 4/2013 | Dumais et al. | |
| 2014/0096220 A1 | 4/2014 | Da Cruz et al. | |
| 2016/0352712 A1 | 12/2016 | Tamp | |

OTHER PUBLICATIONS

NPL Search Terms (Year: 2021).*
DRM device pairing authentication token—Google Scholar, Dec. 19, 2017, 2 pages.

* cited by examiner

TRUSTED STATUS TRANSFER BETWEEN ASSOCIATED DEVICES

CROSS-REFERENCE TO RELATED APPLICATIONS

This application is a continuation of U.S. patent Application Ser. No. 16/113,851, entitled "TRUSTED STATUS TRANSFER BETWEEN ASSOCIATED DEVICES," filed Aug. 27, 2018, which is a continuation of U.S. patent application Ser. No. 15/167,735, entitled "TRUSTED STATUS TRANSFER BETWEEN ASSOCIATED DEVICES," filed on May 27, 2016, issued as U.S. Pat. No. 10,063,540 on Aug. 28, 2018, which claims the benefit of both U.S. Provisional Patent Application No. 62/235,418, entitled "TRUSTED STATUS TRANSFER BETWEEN ASSOCIATED DEVICES," filed on Sep. 30, 2015, and U.S. Provisional Patent Application No. 62/172,221, entitled "TRUSTED STATUS TRANSFER BETWEEN ASSOCIATED DEVICES," filed on Jun. 7, 2015, the contents of which are incorporated by reference herein in their entirety for all purposes.

FIELD

The described embodiments relate generally to managing services for electronic devices. More particularly, the described embodiments relate to authenticating electronic devices for providing device services.

BACKGROUND

Users are often required to sign in or otherwise register when they desire to access various services by way of their electronic devices. Such services can include, for example, cloud storage, downloadable media or content, subscription programming, e-mail, and the like. Because it can be important to identify or confirm an actual user when providing these and other device based services, a sign in, registration, or other authentication of a user attempting to access such services can be required or preferable. Accordingly, a particular user device that is owned or often used by a given user can be authenticated for a device service at some initial point in time so that the user can access that device service thereafter at that user device.

When a user attempts to access that device service from a different or additional user device, it may be necessary to sign in again or otherwise confirm the user at the added user device, which may then provide an authentication for that device service at that added user device. This might be understandable where the user is borrowing or otherwise temporarily using a different user device. Where the user is using their own new or additional user device, however, it can be inconvenient or annoying to have to sign in or manually authenticate again from or on behalf of this separate user device to access the same device services for which the user has already registered and been using. This can be particularly true where the added user device is being used simultaneously and/or in conjunction with an existing user device that has already been authenticated for the device services, such as in the case of paired user devices.

While current user device authentication approaches have worked well in the past, improvements in providing this function are usually welcome. Accordingly, there is a need for systems and techniques that authenticate added user devices in a more convenient manner.

SUMMARY

Representative embodiments set forth herein disclose various systems and techniques for authenticating added user devices for device services. In particular, these embodiments set forth various systems and techniques for authenticating an added user device by transferring a trusted device status from a separate trusted user device to the added user device in a way such that the user is not required to sign in and authenticate manually on the added user device. This can be accomplished by (1) verifying an existing authentication for the separate trusted user device, (2) evaluating data items received from the trusted user device with data items received from the added user device, and (3) facilitating an authentication of the added user device when the evaluation is favorable. According to some embodiments, a token is provided to the trusted user device when the evaluation is favorable, whereby use of the token by the added user device extends a trusted status from the trusted user device to the added user device when this token is provided to the added user device. Received data items can include one-time passwords and machine identifiers for both of the trusted user device and the added user device, as well as a unique password reset key for the trusted user device. Each one-time password may be valid only for a set amount of time after it is formed, and the evaluation can include verifying that one of the passwords was formed while the other one was still valid.

This Summary is provided merely for purposes of summarizing some exemplary embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed systems and methods for authenticating an added user device for device services. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
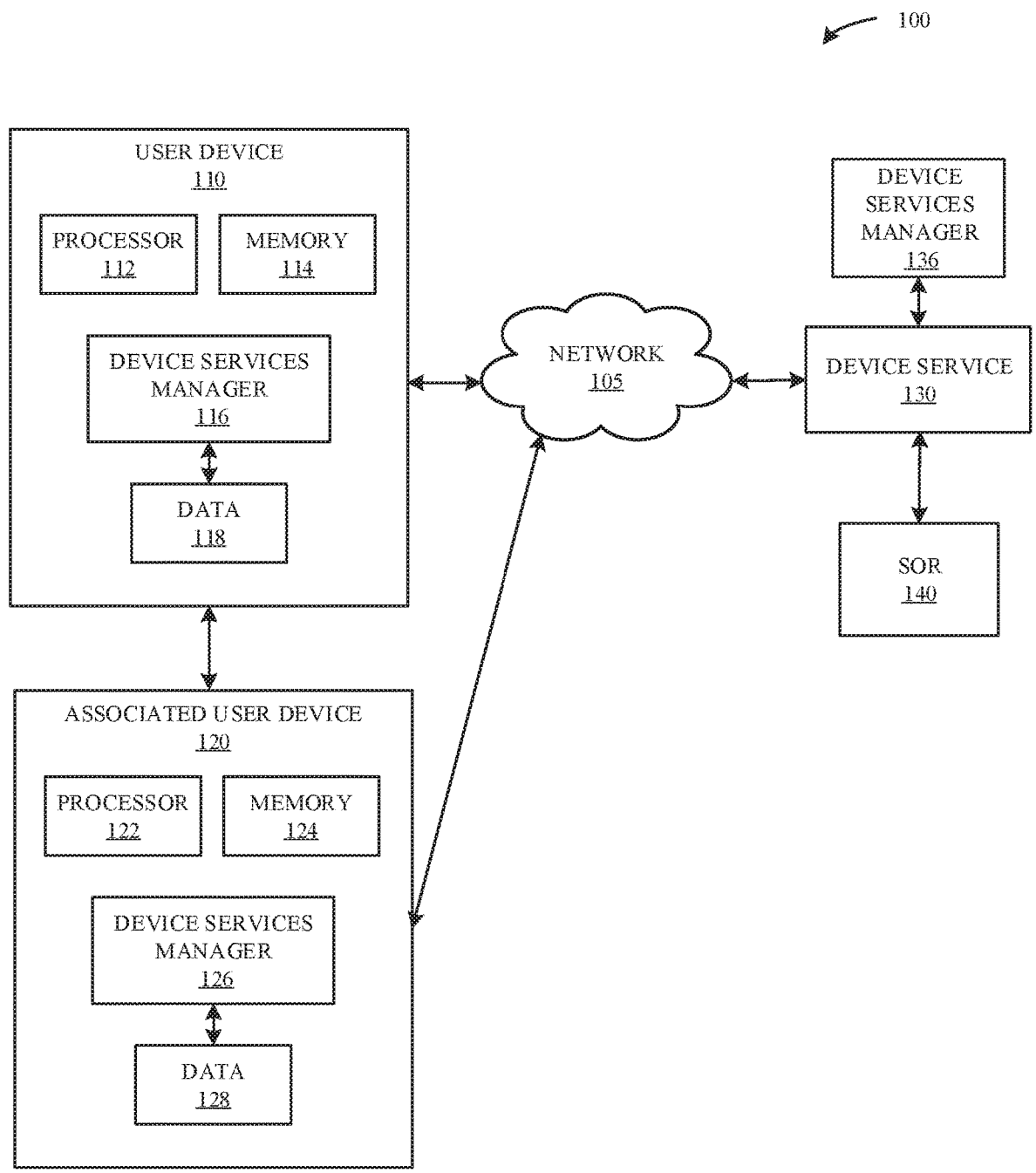
FIG. 1 illustrates in block diagram format various exemplary components of a system adapted to authenticate an added user device for device services according to various embodiments of the present disclosure.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

When a user attempts to access an existing subscribed device service from an added user device, it may be necessary to sign in again or otherwise confirm the user at the added user device. It can be inconvenient or annoying, however, to have to sign in or manually authenticate again from an added user device to access the same device services for which the user has already registered and been using. This can be particularly true where the added user device is being used simultaneously and/or in conjunction with an existing user device that has already been authenticated for the device service, such as in the case of paired user devices.

Accordingly, the embodiments set forth herein provide various systems and techniques for authenticating user devices for device services. In particular, these embodiments set forth various systems and techniques for authenticating an added user device by transferring a trusted device status from a separate trusted user device to the added user device in a way such that the user is not required to sign in and authenticate manually on the added user device. This can be accomplished by (1) verifying an existing authentication for the separate trusted user device, (2) evaluating data items received from the trusted user device with data items received from the added user device, and (3) facilitating an authentication of the added user device when the evaluation is favorable. According to some embodiments, a token is provided to the trusted user device when the evaluation is favorable, whereby use of the token by the added user device extends a trusted status from the trusted user device to the added user device when this token is provided to the added user device. Received data items can include one-time passwords and machine identifiers for both of the trusted user device and the added user device, as well as a unique password reset key for the trusted user device. Each one-time password may be valid only for a set amount of time after it is formed, and the evaluation can include verifying that one of the passwords was formed while the other one was still valid.

Accordingly, the foregoing approaches provide systems and techniques for authenticating added user devices for device services. A more detailed discussion of these systems and techniques is set forth below and described in conjunction with FIGS. 1-8, which illustrate detailed diagrams of systems, components, and methods that can be used to implement these systems and techniques.

Turning first to FIG. 1, various exemplary components of a system adapted to authenticate an added user device for device services are illustrated in block diagram format. Specifically, FIG. 1 illustrates a high-level overview of the system 100, which can include a user device 110, an associated user device 120, and a remote device service 130 with which the initial user device 110 and added user device 120 can communicate, such as via a network 105. The device service 130 can include and/or have access to a separate system of records (SOR) 140, which can contain information and identifiers used to authenticate and verify various user devices for the device service 130.

The associated user device 120 can represent an electronic device that is already authenticated for the device service 130, and thus can be considered a trusted device. Associated user device 120 can be, for example, a mobile device (e.g., an iPhone®) or a tablet device (e.g., an iPad®). Associated user device 120 can also represent any other electronic device for which a user accesses certain device services such as, for example, a laptop computer, or a desktop computer, among other possible electronic user devices. Network 105 can include one or more of the Internet, an intranet, a PAN (Personal Area. Network), a LAN (Local Area Network), a WAN (Wide Area Network), a MAN (Metropolitan Area Network), a wireless communication network, and the like. Device service 130 can include, for example, an IDMS (Integrated. Database Management System) server that is adapted to provide or facilitate the provision of one or more services to user devices (for example, iCloud™ by Apple®).

The user device 110 can represent an electronic device for which authentication is desired for the device service 130. In various embodiments, user device 110 can be in communication with and be associated with the associated user device 120. This can take the form of a pairing arrangement or other suitable device to device association. Accordingly, user device 110 can be, for example, a standalone user device or an accessory device for associated user device 120. In various embodiments, user device 110 and associated user device 120 can be peer user devices to each other. User device 110 can be, for example, a smart watch, a digital media playback device, or a digital media extender. User device 110 can also be any other electronic device suitable for associating with associated user device 120 and receiving device services from device service 130. Since associated user device 120 is already authenticated for the device service 130, and use of this existing authenticated status is to be leveraged to authenticate user device 110, the user device 110 can be considered an added user device for purposes of the existing authenticated status of associated user device 120.

According to the illustration of FIG. 1, the user device 110 can include a processor 112, a memory 114, a device services manager 116, and a data component 118 having data for the user device 110. The processor 112, in conjunction with the memory 114, can be configured to execute the device services manager 116, among other components and applications (not shown) on the user device 110, such as to carry out various functions, techniques, or portions thereof as set forth herein. Similarly, the associated user device 120 can include a processor 122, a memory 124, a device services manager 126, and a data component 128 having data for the associated user device 120. The processor 122, in conjunction with the memory 124, can be configured to execute the device services manager 126, among other components and applications (not shown) on the associated user device 120, such as to carry out various functions, techniques, or portions thereof as set forth herein. A separate device services manager 136 or component can also be located remotely at the device service 130 or elsewhere on the server side, as shown in FIG. 1, which separate server side device services manager 136 can perform various functions, techniques, or portions thereof as set forth herein.

Figure 2A:
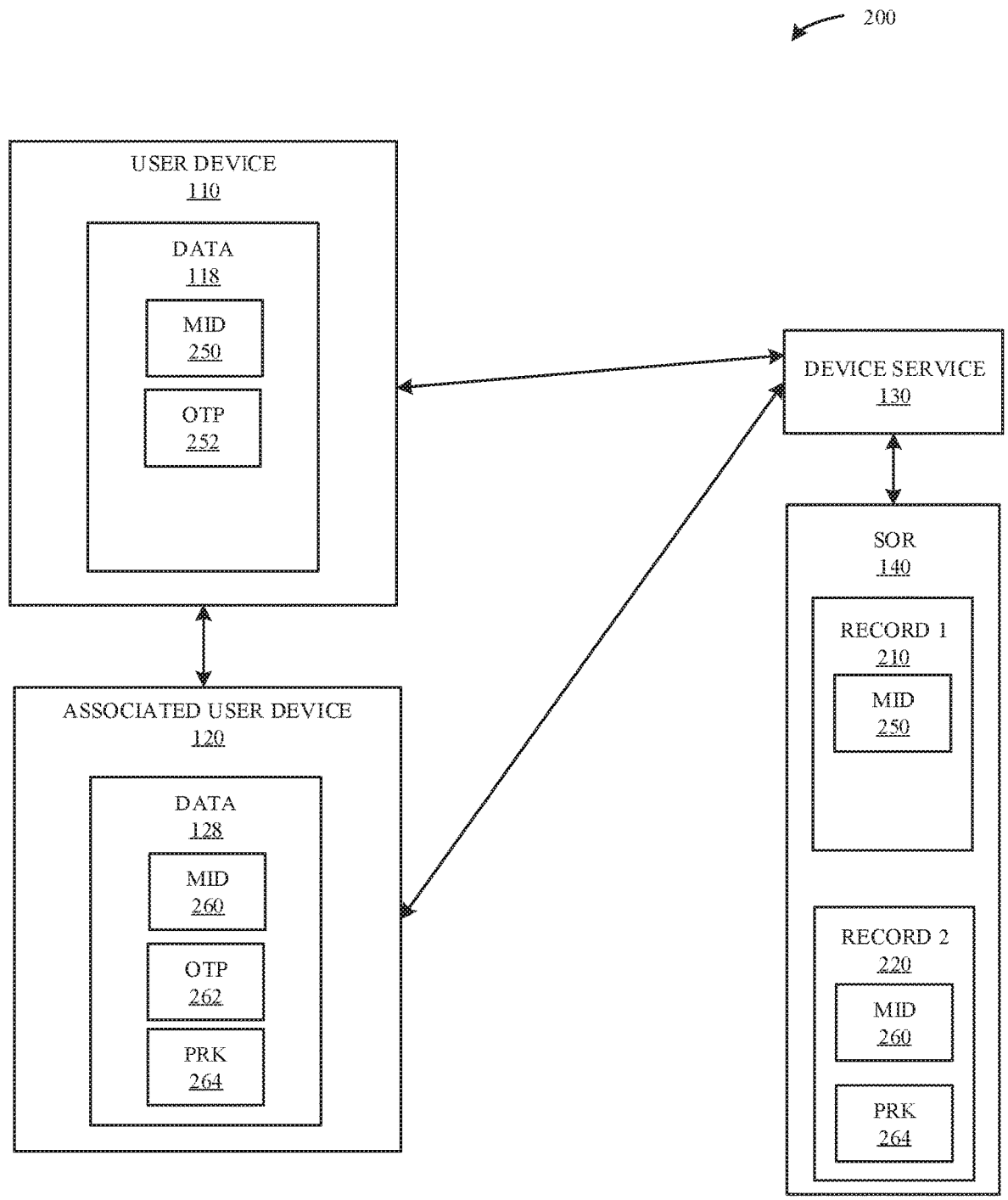
FIG. 2A illustrates in block diagram format an initial state of exemplary components used to transfer a trusted device status from one user device to another user device according to various embodiments of the present disclosure.

Continuing with FIG. 2A, an initial state of exemplary components that can be used to transfer a trusted device status from one user device to another user device are provided in block diagram format. As shown in FIG. 2A, arrangement 200 depicts a user device 110, an associated user device 120, a device service 130, and a SUR. 140, such as those which are set forth and described above with FIG. 1. Again, user device 110 and associated user device 120 can be in communication with and associated with each other, such as by way of a paired arrangement or other device association. In various embodiments, user device 110 and associated user device 120 can be owned or otherwise operated by the same specific user. Both of user device 110 and associated user device 120 can be adapted for communication with device service 130, such as to sign in, become authenticated, and/or access device services provided by device service 130.

User device 110 and associated user device 120 can each have data components 118, 128 containing various data items that are accessible for their respective device services managers. For user device 110, data component 118 can include a unique MID (machine identifier) 250, and a unique OTP (one-time password) 252. A unique PRK (password reset key) for user device 110 is not provided at this initial state in FIG. 2A. For associated user device 120, data component 128 can include a unique MID 260, a unique OTP 262, and a unique PRK 264. Each of MID 250, OTP 252, MID 260, OTP 262, and/or PRK 264 can be provisioned to and stored at its respective device. Such provisioning can be done at a previous time by the device service 130 or a similar service associated with device service 130. This can be done at, for example, the first time that the user device 110 and/or the associated user device 120 ever communicates with the device service 130, or when the associated user device 120 is initially authenticated at the device service 130. Such provisioning or reprovisioning of one or more of these items can also be done at later times, if desired, such as on a recurring basis. Accordingly, MID 250 and MID 260 can both be provisioned identifiers rather than hardware based identifiers. In some embodiments, MID 250 and MID 260 can remain constant for their respective devices, such as where a given MID is provisioned at an install of an operating system on the device. In other embodiments, MID 250 and MID 260 can be reprovisioned or changed regularly, as may be desired.

OTP 252 and OTP 262 can both be one-time passwords that change after each use thereof and/or at periodic time intervals. As such, OTP 252 and OTP 262 represent dynamic items that do not remain constant, but rather are formed anew as different values on a regular basis. Formation of a new OTP can take place any time the OTP is actually used, and can also happen on an automated recurring basis, such as every minute or every 30 seconds, for example. Accordingly, a given OTP may be considered valid only when it has not yet been used and/or for a set period of time after it has been created or formed. Upon a first use and/or an expiration of the set time period, a given OTP may then be considered expired or invalid. In various embodiments, a given OTP can be generated or formed on the device itself. For example, each OTP 262 can be generated at the associated user device 120. This can take place at the device every time a new OTP 262 is needed. In some alternative embodiments, an OTP can be formed and provisioned at another location, such as at the device service 130 or another server. This can occur as a reprovisioning on a regular basis and/or when a given OTP is used. In some embodiments, a corresponding MID may also be reprovisioned and sent to the respective device at or about the same time. In some embodiments, a given MID can instead remain constant and can be used to form and provision a new OTP corresponding to that constant MID. An OTP can also be referred to as a temporary credential set or second credential set. In various embodiments, an OTP can be used to change a primary password or a first credential set without requiring the presence of the primary password or first credential set. Such a change may involve the presence of the relevant PRK.

PRK 264 can be provisioned to the associated user device 120 by the device service 130 or a similar associated device service at a previous time, such as when a constant or an initial MID 260 is provisioned. PRK 264 is not an actual password, but can be an equivalent in some regards. PRK 264 can be a token identifier in some embodiments. PRK 264 can be used to reset the specific password of the user on the associated user device 120, which can be done according to various rules or management settings. In such instances, a given PRK can be used as an identifier for its respective device, such as during a user password reset or recovery process. A PRK can also be referred to as an access recovery parameter.

Various records 210, 220 can exist on SOR 140 or a similar server side component for use by the device service 130. For example, a first record 210 can correspond to the user device 110, and can include one or more data items relevant to user device 110, such as, for example, the MID 250 and the OTP 252. A second record 220 can correspond to the associated user device 120, and can include one or more data items relevant to the associated user device 120, such as, for example, the MID 260, the OTP 262, and/or the PRK 264. These values or data items can be stored at SOR 140 at the time that they are provisioned to their respective user devices, for example. Additional records can exist on SOR 140 for other user devices, as will be readily appreciated. A device services manager 136 or other similar component or module at the device service 130 can be adapted to utilize various data items to determine or evaluate whether a currently provided. OTP is reasonable or favorable. For example, the device service 130 can be adapted to use at least one or more known MAN and one or more known PRKs to determine whether a currently provided OTP makes sense. This determination can also include other data items, such as a current time and/or date, and also another currently provided OTP.

Figure 2B:
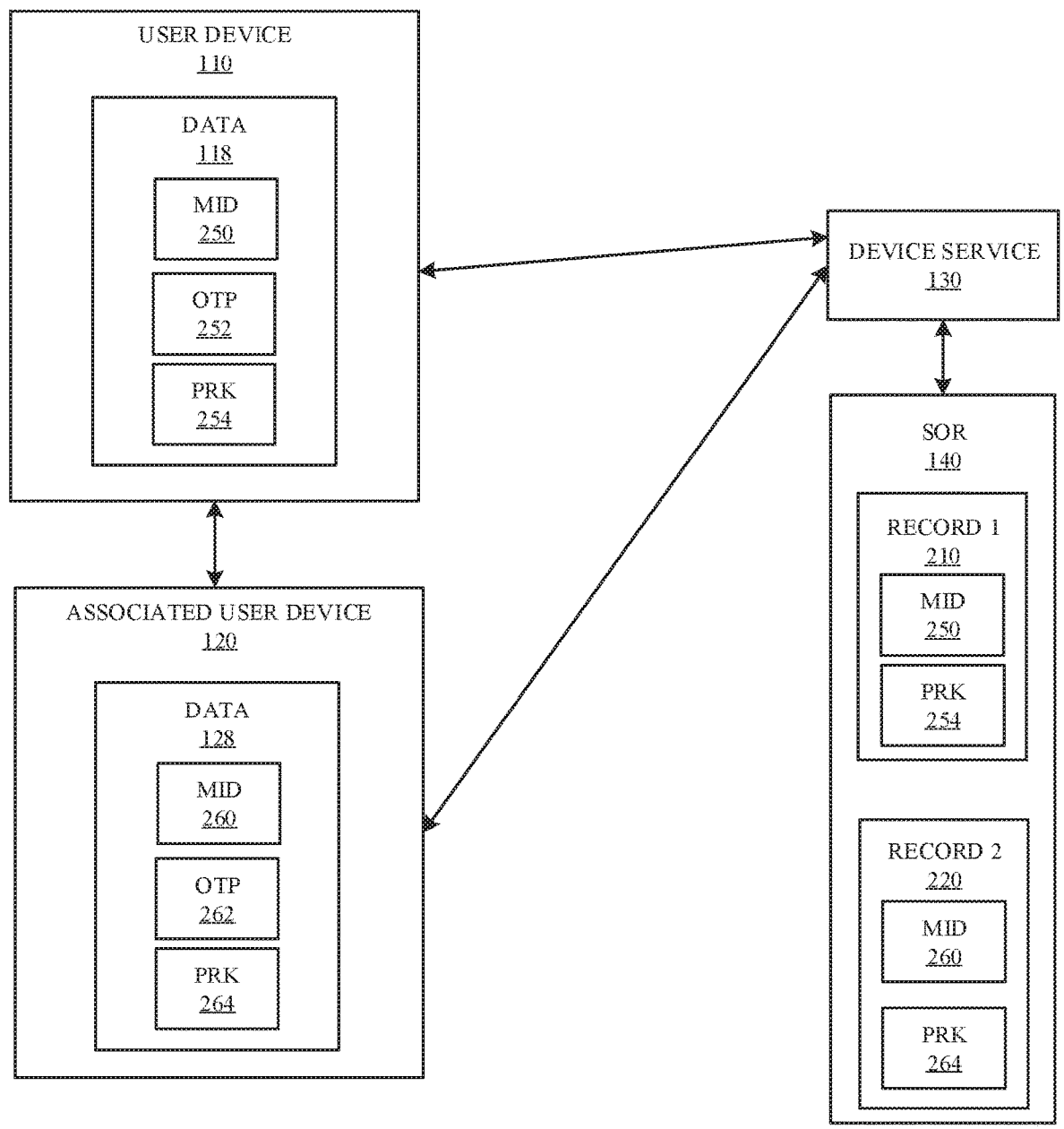
FIG. 2B illustrates in block diagram format a final state of the exemplary components of FIG. 2A after transfer of a trusted device status from one user device to another user device according to various embodiments of the present disclosure.

FIG. 2B illustrates in block diagram format a final state of the exemplary components of FIG. 2A after transfer of a trusted device status from one user device to another user device according to various embodiments of the present disclosure. As shown for arrangement 201 in FIG. 2B, one difference between the initial state and the final state is that the user device 110 now has its own PRK 254, and this PRK 254 is recorded at the SOR 140 to Record 1 210 for the specific user device 110, This PRK 254 is provided to the user device 110 upon a transfer of trusted device status from the associated user device 120 to the user device 110, as set forth in greater detail below. By having its own PRK 254, the user device 110 is then able to access device service 130 on its own and perform various other functions only available to a signed in or otherwise trusted device. In various embodiments, a provisioned MID 250 may also not be present at user device 110 until after a trusted device status is transferred or another provisioning takes place with respect to user device 110.

In various embodiments, a comparison or evaluation can be made between a currently provided OTP 252 and a currently provided OTP 262, which comparison or evaluation can also make use of MID 250, MID 260, and PRK 264, for example. Given that which is known about these various data items and the nature of how DTPs are formed, it can at least be determined whether both of OTP 252 and OTP 262 are currently valid, and/or whether OTP 252 and OTP 262 were formed at or about the same time. In various embodiments, this can mean that one of OTP 252 and OTP 262 was formed while the other was already formed and was still valid. Such a determination, as part of an overall comparison or evaluation of MID 250, MID 260, PRK 264, OTP 252, and OTP 262, can be sufficient in some embodiments to provide a favorable result or reasonable conclusion that the user device 110 is a device where a trusted status or authentication of the associated user device 120 can be transferred. In this context, a "transfer" of a trusted status can mean that the trusted status is extended to another device and is not lost or surrendered by the original device.

In some embodiments, verification of a specific PRK itself can also provide or tend toward a favorable result. In various embodiments, each PRK is a specific key or token that is not available to be sent from a device unless that device is locally unlocked and accessible, such as through the entry on the device of a user password, access code, a fingerprint, another biometric identifier, or any other suitable convention that locally unlocks a device. Accordingly, the existence of a currently provided unique and verifiable PRK is an indication on its own that the device for that PRK was locally unlocked at the time the PRK was sent. Such a locally unlocked state for a device can carry a presumption that the actual user or a trusted user was operating the device at the time that the PRK was sent.

An overall evaluation of all of the provided data items, which can include one or more determinations such as that set forth above, can be performed at the device service 130 or a device services manager thereof, for example. When the overall evaluation returns a favorable result, then the device service 130 can generate a token, such as an authentication token, and provide the token to the associated user device 120, which can in turn provide the token to the user device 110. This authentication token can then be used by the user device 110 to assert and enjoy the same trusted status and/or existing authentication as that which is done by the associated user device 120, such as by being able to access the same user account with the same privileges on the device service 130. Accordingly, the user device 110 can be considered an added user device with respect to the existing authentication of the associated user device. Importantly, this is accomplished without requiring the user to sign in and authenticate manually on the user device 110.

In various embodiments, the authentication token can be a master token. This master token can be used to request and receive additional specialized tokens for use with different device services, for example. In each such instance, a returned specialized token can allow the user device 110 to appear or project as if it were actually the associated user device 120 when used as an authenticating item for the specific device service(s) that corresponds to the specialized token.

Figure 3:
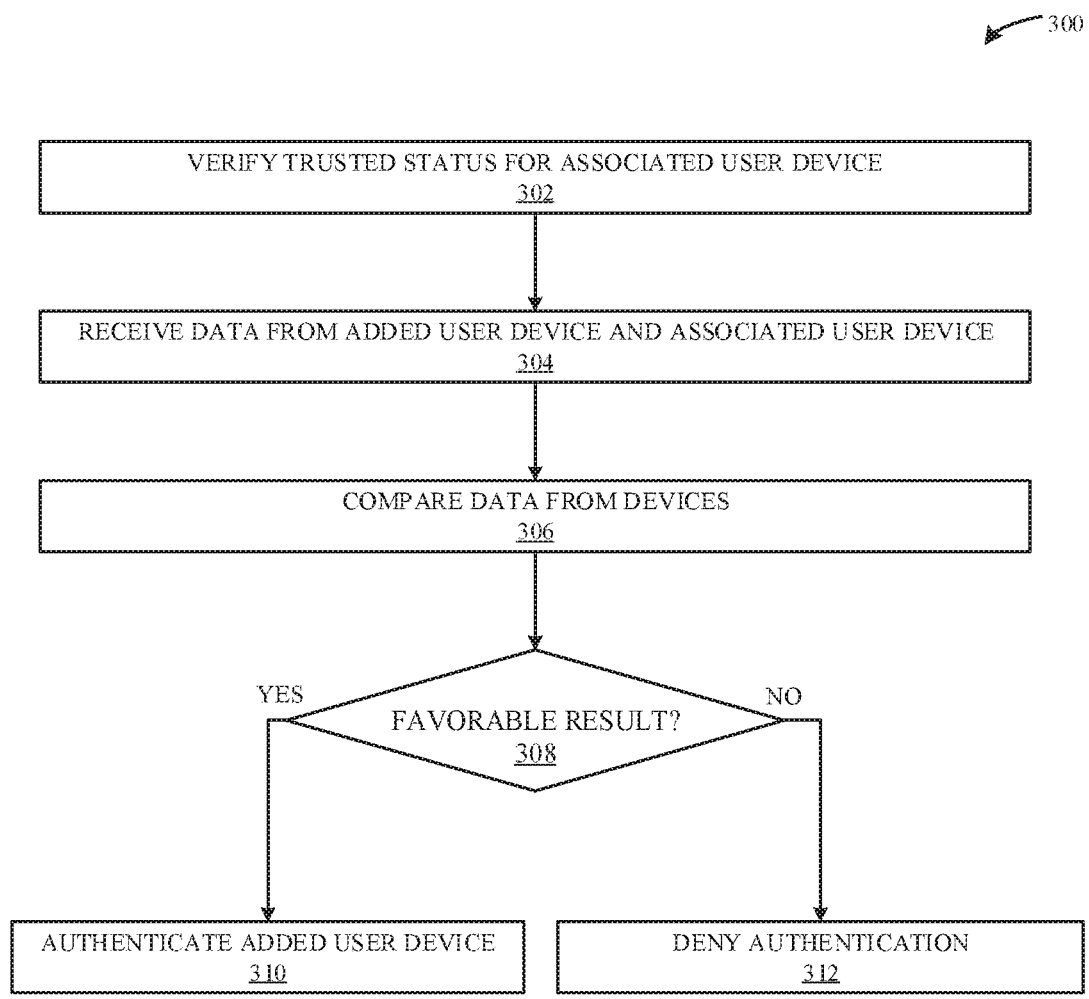
FIG. 3 illustrates a basic flowchart of an exemplary method for transferring a trusted device status from one user device to another user device according to various embodiments of the present disclosure.

FIG. 3 illustrates a basic flowchart of an exemplary method for transferring a trusted device status from one user device to another user device according to various embodiments of the present disclosure. Again, this can involve an associated user device having a trusted status that is being transferred (i.e., extended) to an added user device. Method 300 can be performed by, for example, a device services manager, which can be located on a server for providing device services or another suitable server side processing component. Method 300 begins at step 302, where a trusted status for an associated user device can be verified. This trusted status can include an existing authentication for the associated user device, which device can be signed in to the server and therefore have a cryptographically verifiable state. This verifiable state can be, for example, an "authorized" state with respect to the device service at issue (e.g., iCloud).

At step 304, data from both of the added user device and the associated user device can be received. The various data items received can include those set forth above in earlier details, for example. Data items for each device can be sent by the respective device, or, alternatively, the associated user device can collect data items from the added user device and forward those along with its own data items. Again, these data items can include: (1) an MID and OTP from the added user device, (2) an MID and OTP from the associated user device, and (3) a PRK from the associated user device, among other possible data items.

At step 306, the received data can then be compared or evaluated. In particular, this comparison or evaluation can aim to determine whether the data items from the added user device reflect a suitable level of association or trust with respect to the data items from the associated user device. Such a determination can focus on, for example, whether the (i)TP received from the added user device contains or reflects certain properties. This can include indicators as to whether the added user device (i)TP is still valid and not expired, whether the added user device OTP was valid and not expired at the same time the associated user device OTP was valid and not expired (e.g., both OTPs were formed at or about the same time), and/or which data or items were used to form the added user device OTP (e.g., data specific to the associated user device), for example. In addition, the existence of a PRK can reflect that its device was unlocked at the time that its data items were sent, which can reflect that a proper person was using that device.

At decision step 308, an inquiry can be made as to whether the evaluation has returned a favorable result. Again, such a favorable result can be a determination that the added user device is one that is closely associated with or trusted by the associated user device, such as where both devices are apparently being used by the same user, in the same vicinity and/or at the same time. If the result is favorable at decision step 308, then the added user device can be authenticated at step 310. If the result is not favorable at decision step 308, however, then the added user device can be denied authentication at step 312. The authentication can be the same as for the associated user device (e.g., signed in on same user account), such that the trusted status of the associated user device is thus transferred to the added user device at step 310. In particular, the entire method can be accomplished in automate fashion, such as by a device services manager. Thus, the user for the added user device and the associated user device is not required to sign in and authenticate manually on the added user device.

Figure 4:
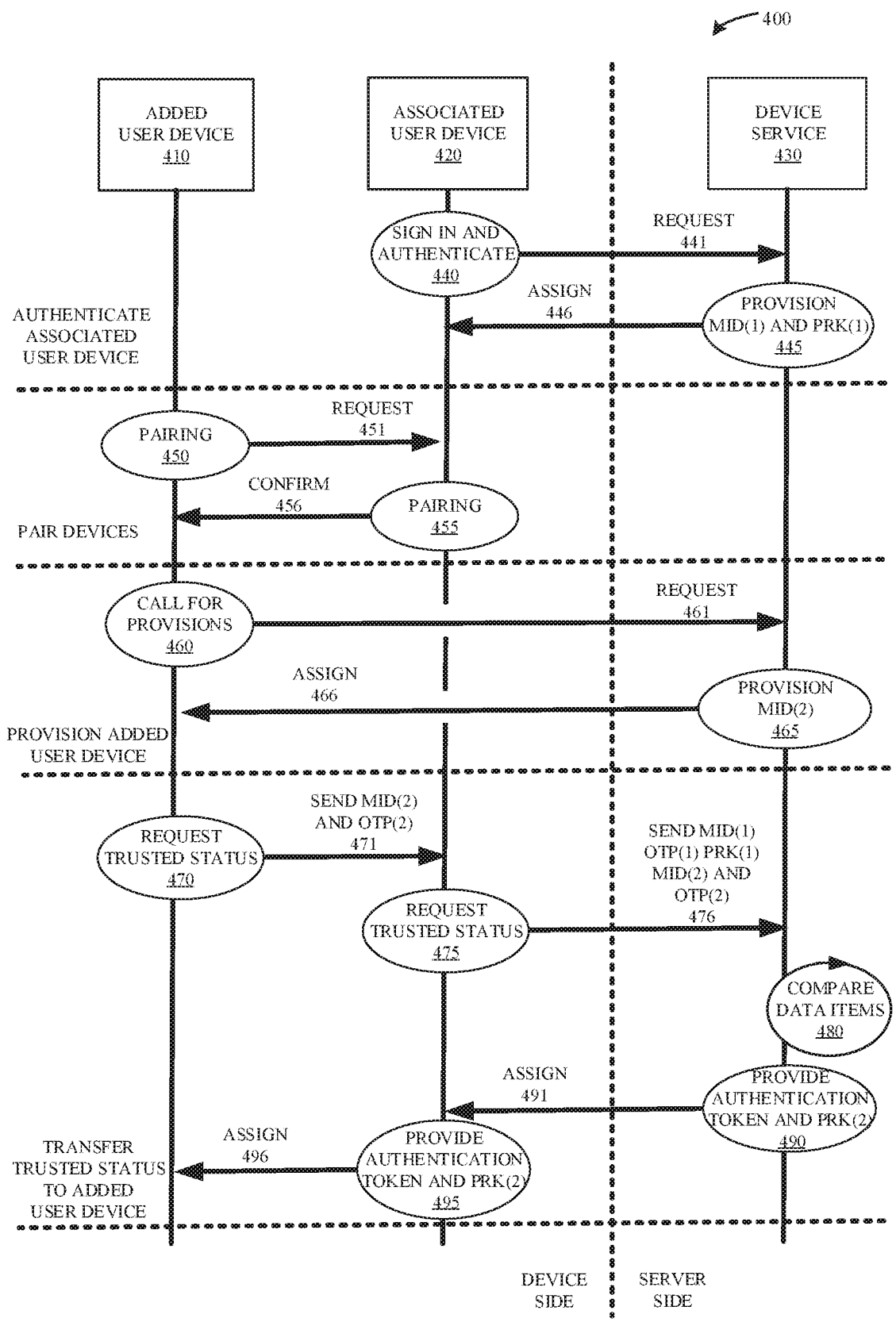
FIG. 4 illustrates a sequence diagram for authenticating an added user device by transferring a trusted device status using the added user device, an associated user device, and a server that provides device services according to various embodiments of the present disclosure.

FIG. 4 illustrates a sequence diagram for authenticating an added user device by transferring a trusted device status using the added user device, an associated user device, and a server that provides device services according to various embodiments of the present disclosure. Sequence diagram 400 can involve various events, items, and stages that take place between an added user device 410 and an associated user device 420 on a device side, and a device service 430 on a server side. The various states for sequence diagram 400 can generally include an original authentication of the associated user device stage, which can happen much earlier in time than the rest of the states, a device pairing stage, a provisioning of the added user device stage, and a transferring of trusted status to the added user device stage.

At a first sequence event 440, the associated user device 420 can sign in and authenticate on the device service 430. Accordingly, a request 441 to sign in and authenticate can be sent from the associated user device to the device service 430. Upon a proper registration and sign in, the device service 430 can authenticate the associated user device 420 and can provision a unique MID(1) and a unique PRK(1) for the associated user device 420 at sequence event 445. A unique OTP(1) might also be sent in some embodiments. Accordingly, these items can be sent to the associated user device 420 at return assignment 446. These items can then be stored on the now authenticated associated user device 120 for later use, as noted above.

At a later sequence event 450, an added user device 410 can become active and seek a pairing, such as by sending a pairing request 451 to the associated user device 420. At sequence event 455, the associated user device can receive and act on the pairing request 451 by performing its own confirming pairing functions 456 back to added user device 410.

At sequence event 460, which can be a later time or contemporaneously with the pairing activities, the added user device 410 can make its own call for provisions, such as by request 461 to the device service 430. At sequence event 465, the device service 430 can response to request 461 by provisioning a unique MID(2) for the added user device 410, which is then sent to the added user device 410 at return assignment 466. This item can then be stored on the added user device 410 for later use. Again, a unique OTP(2) might also be sent in some embodiments.

In various embodiments, each OTP(1) and OTP(2) can be formed or generated at each respective device separately according to generating or updating rules or conventions, as may be desired. For example, associated user device 420 can generate its own OTP(1), and added user device 410 can generate its own OTP(2). As such, the OTP(1) and OTP(2) values may change upon such formation or generation, which can happen at regular intervals and/or upon use of a given OTP.

At sequence event 470, which can be a later time or contemporaneously with the pairing and provisioning the added user device activities, the added user device 410 can send a request for a transfer of trusted status to the associated user device 420, to which the added user device 410 is now paired. Again, such a device pairing can be in the form of an accessory device, or as a peer device. This request to the associated user device 420 from the added user device 410 can attach and send data items 471 therewith, which can include the MID(2) and an UTP(2) for the added user device 410. At sequence event 475, the associated user device 420 can receive the request and data items from added user device 410 and then forward or send its own request for a transfer of trusted status to the device service 430. This request to the device service 430 from the associated user device 420 can attach and send data items 476 therewith, which can include the MID(1), an OTP(1), and the PRK(1) for the associated user device 420, as well as the MID(2) and the OTP(2) for the added user device 410.

At sequence event 480, the device service 430 can receive the request for a transfer of trusted status and data items from the associated user device 420, and can then compare or evaluate the data items to determine whether the trusted status transfer request (e.g., authenticated state extension) is to be granted. If the evaluation fails or is unfavorable, then the request is not granted. If the evaluation returns a favorable result though, then the device service can provide an authentication token and a PRK(2) for the added user device 410 at sequence event 490. This authentication token and PRK(2) can be provided from the device service 430 to the associated user device 420 via assign reponse 491. At a following sequence event 495, the associated user device 420 can provide the authentication token and PRK(2) to the added user device 410 via assign response 496. The added user device 410 can then store this authentication token and PRK(2) and use one or both of these items as needed to assert and enjoy the same extended trusted status enjoyed by the associated user device 420. Again, the entirety of at least the transfer trusted status stage can be performed in automated fashion, such that the user is not required to sign in and authenticate manually on the added user device 410. In various embodiments, a PRK(2) may not be sent to the added user device 410, such that only an authentication token is provided.

Figure 5:
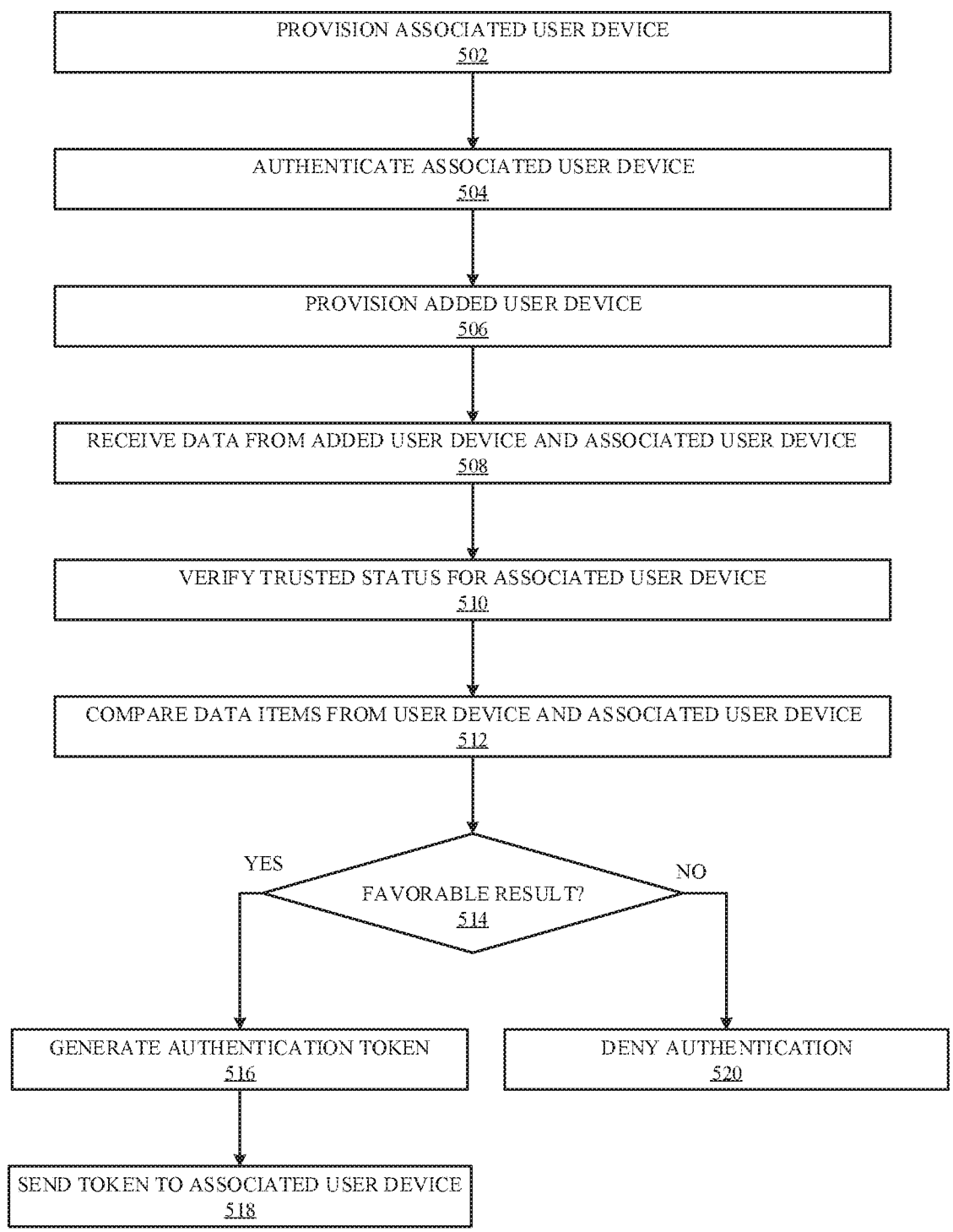
FIG. 5 illustrates a flowchart of an exemplary method for transferring a trusted device status performed by a device services manager at a server according to various embodiments of the present disclosure.

FIG. 5 illustrates a flowchart of an exemplary method for transferring a trusted device status performed by a device services manager at a server according to various embodiments of the present disclosure. Method 500 can correspond to that which is performed by device service 430 in the foregoing sequence diagram, for example. Method 500 begins at step 502, where an associated user device can be provisioned. This can include, for example, providing a unique MID and a unique PRK to the associated user device. At step 504, the associated user device can be authenticated, which can take place contemporaneously with the provisioning of step 502 in some instances. At step 506, an added user device can be provisioned, which can take place at some time later than steps 502 and 504 in some instances.

Step 506 can involve providing a unique MID to the added user device.

At step 508, the device services manager at the server can receive data items from both of the added user device and the associated user device. As detailed above, this can include, for example, an MID for both devices, an OTP for both devices, and a PRK for the associated user device, among other possible data items. Again, each device can generate and provide its own OTP as needed. At step 510, the device services manager at the server can verify a trusted status for the associated user device. In some embodiments, this can be done using the received data items. At step 512, the data items received from the user device and the associated user device can be compared or evaluated, such as by way of that which is described in greater detail above at step 306, for example.

At decision step 514, an inquiry can be made as to whether the evaluation has returned a favorable result. If the result is favorable at decision step 514, then the method can continue to step 516, but if the result is not favorable then the added user device can be denied authentication at step 520. At step 516, if favorable, then the device services manager at the server can generate an authentication token, and possibly also a PRK for the added user device. This authentication token (and possibly PRK) can then be sent to the associated user device at step 518. From the point of view of the server, the process is then finished. Future use of the authentication token, new PRK, or any derivatives thereof by the added user device can appear to be identical to ordinary authentication usage by the associated user device in some embodiments.

Figure 6:
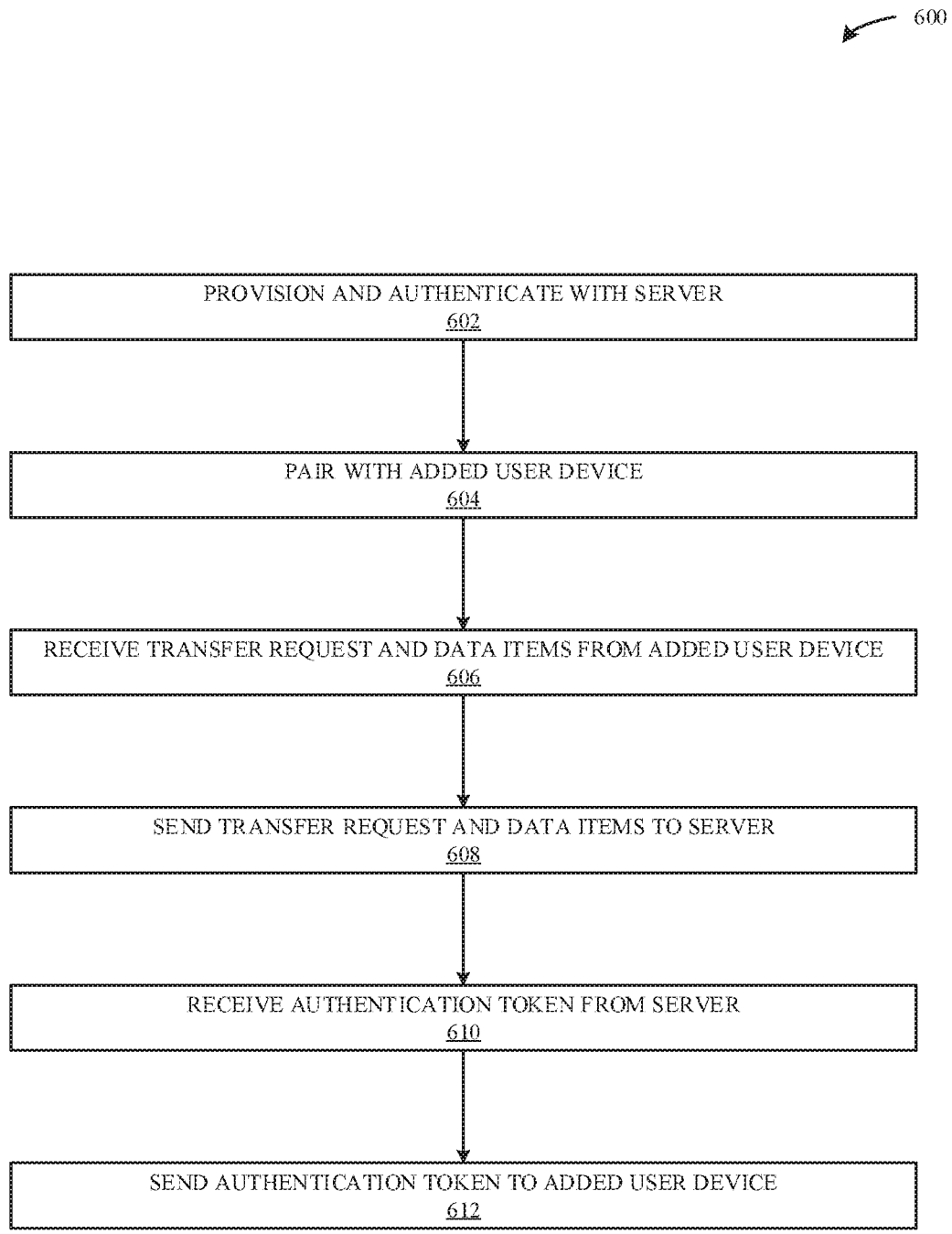
FIG. 6 illustrates a flowchart of an exemplary method for transferring a trusted device status performed by a device services manager at an associated user device according to various embodiments of the present disclosure.

FIG. 6 illustrates a flowchart of an exemplary method for transferring a trusted device status performed by a device services manager at an associated user device according to various embodiments of the present disclosure. Method 600 can correspond to that which is performed by associated user device 420 in the foregoing sequence diagram, for example. Method 600 begins at step 602, where the associated user device is provisioned and authenticated by a server that provides device services. Various values or data items that reflect or confirm this can be stored on the associated user device, such as a unique MID and unique PRK. At step 604, the associated user device pairs with an added user device. At step 606, the associated user device receives a request from the added user device to transfer a trusted status to the added user deuce, which request can be accompanied by one or more data items from the added user device.

At step 608, in response to the request from the added user device to which it can be paired, the associated user device sends a request to transfer a trusted status to the added user device to the server. This request can also be accompanied by one or more data items, which can include the data items sent by the added user device, as well as further data items from the associated user device. At a following step 610, which can take place when the server grants the request, the associated user device receives an authentication token and possibly a unique PRK for the added user device from the server. At step 612, the associated user device sends the authentication token and possibly the unique PRK to the added user device. From the point of view of the associated user device, the process is then finished.

Figure 7:
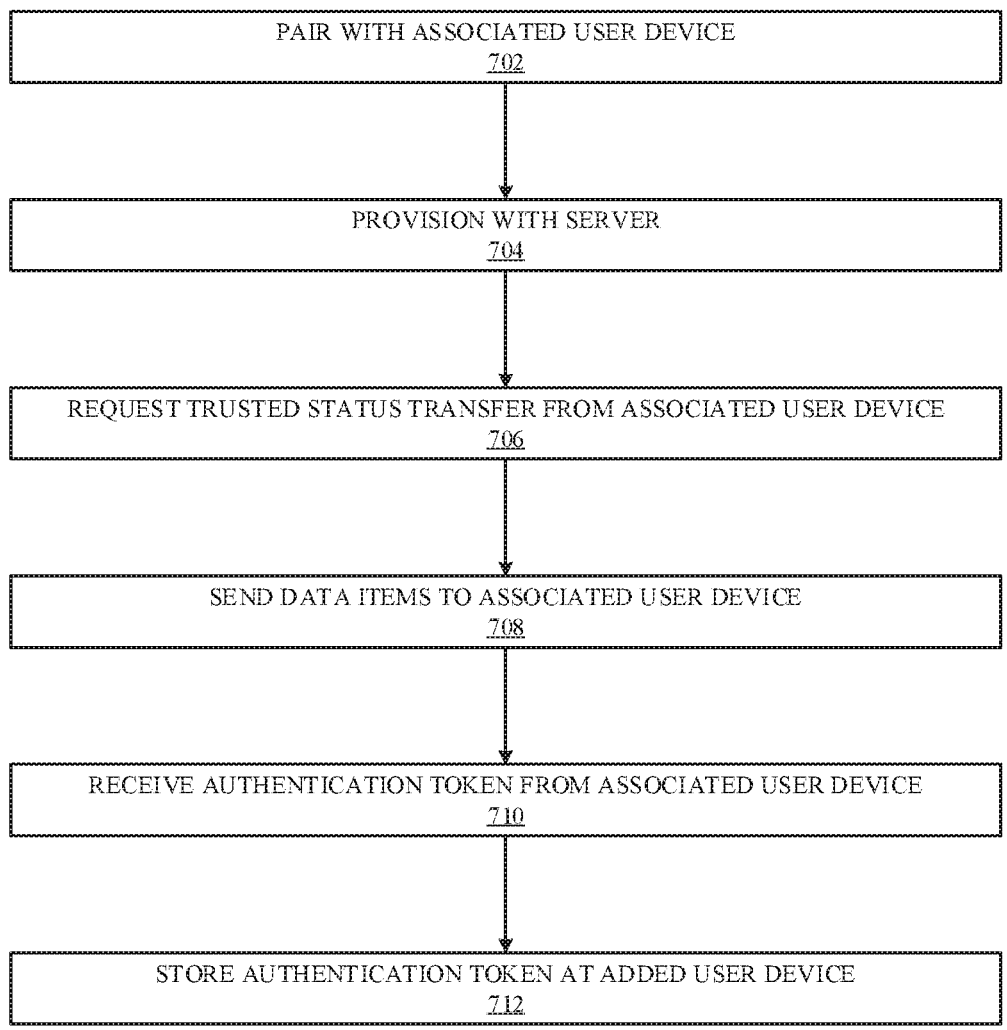
FIG. 7 illustrates a flowchart of an exemplary method for transferring a trusted device status performed by a device services manager at an added user device according to various embodiments of the present disclosure.

FIG. 7 illustrates a flowchart of an exemplary method for transferring a trusted device status performed by a device services manager at an added user device according to various embodiments of the present disclosure. Method 700 can correspond to that which is performed by added user device 410 in the foregoing sequence diagram, for example.

Method 700 begins at step 702, where the added user device pairs with an associated user device. As will be readily appreciated, the associated user device can already be authenticated by a server that provides device services at this point. At step 704, the added user device is provisioned by the server. Various values or data items that reflect or confirm this can be stored on the added user device, which can include a unique MID, for example.

At step 706, the added user device requests a transfer of a trusted status from the associated user device. The added user device sends data items for itself to the associated user device to facilitate this request at step 708, which can be performed at the same time as step 706, such as where the request and the data items are sent together. At step 710, which can take place when the request is granted, the added user device receives an authentication token, and possibly a unique PRK, and the added user device can store this authentication token (and possible unique PRK) on itself for future use at step 712. Again, future use of the authentication token, new PRK, or any derivatives thereof by the added user device can appear to be identical to ordinary authentication usage by the associated user device in some embodiments.

Figure 8:
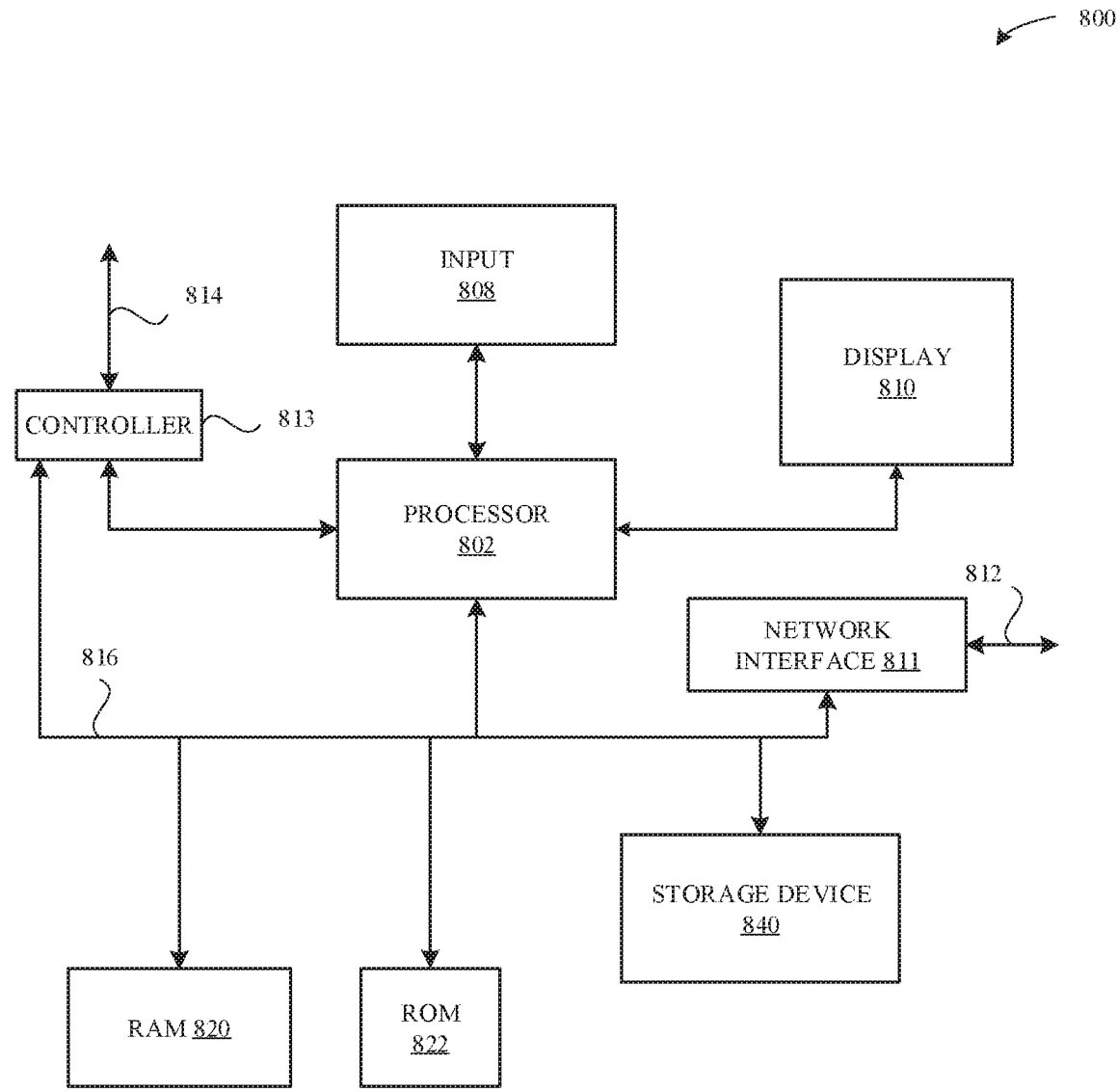
FIG. 8 illustrates in block diagram format an exemplary computing device that can be used to implement the various components and techniques described herein according to various embodiments of the present disclosure.

FIG. 8 illustrates in block diagram format an exemplary computing device 800 that can be used to implement the various components and techniques described herein according to various embodiments of the present disclosure. In particular, the detailed view illustrates various components that can be included in the user device 110 illustrated in FIG. 1, among other possible user devices. As shown in FIG. 8, the computing device 800 can include a processor 802 that represents a microprocessor or controller for controlling the overall operation of computing device 800. The computing device 800 can also include a user input device 808 that allows a user of the computing device to interact with the computing device 800. For example, the user input device 808 can take a variety of forms, such as a button, keypad, dial, touch screen, audio input interface, visual/image capture input interface, input in the form of sensor data, etc. Still further, the computing device 800 can include a display 810 (screen display) that can be controlled by the processor 802 to display information to the user (for example, a movie or other AV or media content). A data bus 816 can facilitate data transfer between at least a storage device 840, the processor 802, and a controller 813. The controller 813 can be used to interface with and control different equipment through and equipment control bus 814. The computing device 800 can also include a network/bus interface 811 that couples to a data link 812. In the case of a wireless connection, the network/bus interface 811 can include a wireless transceiver.

The computing device 800 can also include a storage device 840, which can comprise a single disk or a plurality of disks (e.g., hard drives), and can include a storage management module that manages one or more partitions within the storage device 840. In some embodiments, storage device 840 can include flash memory, semiconductor (solid state) memory or the like. The computing device 800 can also include a Random Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of computing device 800.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for granting a trusted status, the method comprising:
    by at a first client device associated with a first unique device identifier:
        receiving, from a second client device, a first request to grant the trusted status to the second client device, wherein the first request includes a second unique device identifier associated with the second client device;
        transmitting, to a computing device, a second request to grant the trusted status to the second client device, wherein the second request includes (i) the first unique device identifier, and (ii) the second unique device identifier; and
        in response to receiving an indication that the second client device is granted the trusted status by the computing device:
            receiving an authentication token from the computing device, and
            sending the authentication token to the second client device such as to grant the trusted status to the second client device.

2. The method of claim 1, wherein, prior to receiving the first request, the first client device is paired with the second client device.

3. The method of claim 1, wherein, prior to receiving the first request, the first client device is authenticated by the computing device.

4. The method of claim 3, wherein a first password reset key is stored at the first client device, and the first password reset key indicates that the first client device is authenticated by the computing device.

5. The method of claim 4, wherein, in response to receiving the indication that the second client device is granted the trusted status by the computing device, the method further comprises:
    receiving a second password reset key from the computing device, and
    sending the second password reset key to the second client device.

6. The method of claim 1, wherein the first request further includes a data item that indicates that the first client device is associated with the second client device.

7. The method of claim 6, wherein the data item includes at least one of (i) a first one-time password for the first client device or (ii) a second one-time password for the second client device.

8. The method of claim 1, wherein the second client device is granted the trusted status in response to the computing device verifying the first unique device identifier and the second unique device identifier.

9. A first client device for granting a trusted status, the first client device associated with a first unique device identifier, the first client device comprising:
    at least one processor; and
    at least one memory storing instructions that, in response to being executed by the at least one processor, cause the first client device to:
        receive, from a second client device, a first request to grant the trusted status to the second client device, wherein the first request includes a second unique device identifier associated with the second client device;
        transmit, to a computing device, a second request to grant the trusted status to the second client device, wherein the second request includes (i) the first unique device identifier, and (ii) the second unique device identifier; and
        in response to receiving an indication that the second client device is granted the trusted status by the computing device:
            receive an authentication token from the computing device, and
            send the authentication token to the second client device such as to grant the trusted status to the second client device.

10. The first client device of claim 9, wherein, prior to receiving the first request, the first client device is authenticated by the computing device.

11. The first client device of claim 10, wherein a first password reset key is stored at the first client device, and the first password reset key indicates that the first client device is authenticated by the computing device.

12. The first client device of claim 11, wherein, in response to receiving the indication that the second client device is granted the trusted status by the computing device, the at least one processor further causes the first client device to:
    receive a second password reset key from the computing device, and
    send the second password reset key to the second client device.

13. The first client device of claim 9, wherein the first request further includes a data item that indicates that the first client device is associated with the second client device.

14. The first client device of claim 9, wherein the second client device is granted the trusted status in response to the computing device verifying the first unique device identifier and the second unique device identifier.

15. At least one non-transitory computer readable storage medium storing instructions that, in response to being executed by at least one processor included in a first client device associated with a first unique device identifier, cause the first client device to:

receive, from a second client device, a first request to grant a trusted status to the second client device, wherein the first request includes a second unique device identifier associated with the second client device;

transmit, to a computing device, a second request to grant the trusted status to the second client device, wherein the second request includes (i) the first unique device identifier, and (ii) the second unique device identifier; and in response to receiving an indication that the second client device is granted the trusted status by the computing device:

receive an authentication token from the computing device, and send the authentication token to the second client device such as to grant the trusted status to the second client device.

16. The at least one non-transitory computer readable storage medium of claim 15, wherein, prior to receiving the first request, the first client device is paired with the second client device.

17. The at least one non-transitory computer readable storage medium of claim 15, wherein, prior to receiving the first request, the first client device is authenticated by the computing device.

18. The at least one non-transitory computer readable storage medium of claim 17, wherein a first password reset key is stored at the first client device, and the first password reset key indicates that the first client device is authenticated by the computing device.

19. The at least one non-transitory computer readable storage medium of claim 18, wherein, in response to receiving the indication that the second client device is granted the trusted status by the computing device, the at least one processor further causes the first client device to:

receive a second password reset key from the computing device, and send the second password reset key to the second client device.

20. The at least one non-transitory computer readable storage medium of claim 15, wherein the first request further includes a data item that indicates that the first client device is associated with the second client device.

* * * * *

UNITED STATES PATENT AND TRADEMARK OFFICE
CERTIFICATE OF CORRECTION

PATENT NO.          : 11,184,353 B2
APPLICATION NO.     : 16/281001
DATED               : November 23, 2021
INVENTOR(S)         : James C. Wilson et al.

It is certified that error appears in the above-identified patent and that said Letters Patent is hereby corrected as shown below:

In the Specification

At Column 5, Line 40: "user device 120, a device service 130, and a SUR. 140, such" should read -- user device 120, a device service 130, and a SOR 140, such --.

At Column 7, Line 8: "use at least one or more known MAN and one or more" should read -- use at least one or more known MIDs and one or more --.

At Column 7, Line 37: "data items and the nature of how DTPs are formed, it can at" should read -- data items and the nature of how OTPs are formed, it can at --.

At Column 8, Line 60: "(i)TP received from the added user device contains or" should read -- OTP received from the added user device contains or --.

At Column 8, Line 62: "whether the added user device (i)TP is still valid and not" should read -- whether the added user device OTP is still valid and not --.

At Column 10, Line 19: "include the MID(2) and an UTP(2) for the added user device" should read -- include the MID(2) and an OTP(2) for the added user device --.

At Column 11, Line 46: "added user deuce, which request can be accompanied by one" should read -- added user device, which request can be accompanied by one --.

Signed and Sealed this
Fourth Day of July, 2023

Katherine Kelly Vidal
*Director of the United States Patent and Trademark Office*